United States Patent [19]

Bringsen

[11] Patent Number: 5,626,303
[45] Date of Patent: May 6, 1997

[54] FLY-FISHING WITH VARIABLE DRAG

[76] Inventor: Berne Bringsen, Parkväagen 33, S-375 00 Mörrum, Sweden

[21] Appl. No.: 507,443

[22] PCT Filed: Feb. 17, 1994

[86] PCT No.: PCT/SE94/00132

§ 371 Date: Oct. 30, 1995

§ 102(e) Date: Oct. 30, 1995

[87] PCT Pub. No.: WO94/19937

PCT Pub. Date: Sep. 5, 1994

[30] Foreign Application Priority Data

Mar. 10, 1993 [SE] Sweden .................. 9300785

[51] Int. Cl.$^6$ .................. A01K 89/015
[52] U.S. Cl. .................. 242/265; 242/270; 242/295; 242/303; 242/317
[58] Field of Search .................. 242/264, 265, 242/270, 295, 303, 317

[56] References Cited

U.S. PATENT DOCUMENTS 2,922,595  1/1960  Holahan .

FOREIGN PATENT DOCUMENTS 455257  7/1988  Sweden .
478897  1/1938  United Kingdom .

*Primary Examiner*—Daniel P. Stodola
*Assistant Examiner*—Emmanuel M. Marcelo
*Attorney, Agent, or Firm*—Merchant, Gould, Smith, Edell, Welter & Schmidt, P.A.

[57] ABSTRACT

A fly-fishing reel has a line spool (18) rotatable about a shaft (6), and a handle (26) for rotating the line spool (18) for winding a line thereon. An inner sleeve (9) is freely rotatable about the shaft (6) in the winding direction but non-rotatably connected to the shaft in the other direction, i.e. the unwinding direction. The inner sleeve (9) has a first drag washer (11) provided at one end thereof, and an outwardly threaded portion (9b) provided at the other end thereof. An outer sleeve (13), which constitutes a hub non-rotatably connected to the line spool (18) and supports a second drag washer (14), is freely rotatable about the inner sleeve (9) in both directions. The two drag washers (11, 14) are arranged to cooperate in order to brake the line spool (18) when rotated in the unwinding direction. An operating sleeve (23), which is non-rotatably connected to the handle (26), is screwed on the threaded portion (9b) of the inner sleeve (9) in order, when the handle is rotated in the winding direction, to be further screwed on this threaded portion (9b) while being axially pressed against the outer sleeve (13) such that the two drag washers (11, 14) are pressed harder against one another.

4 Claims, 1 Drawing Sheet

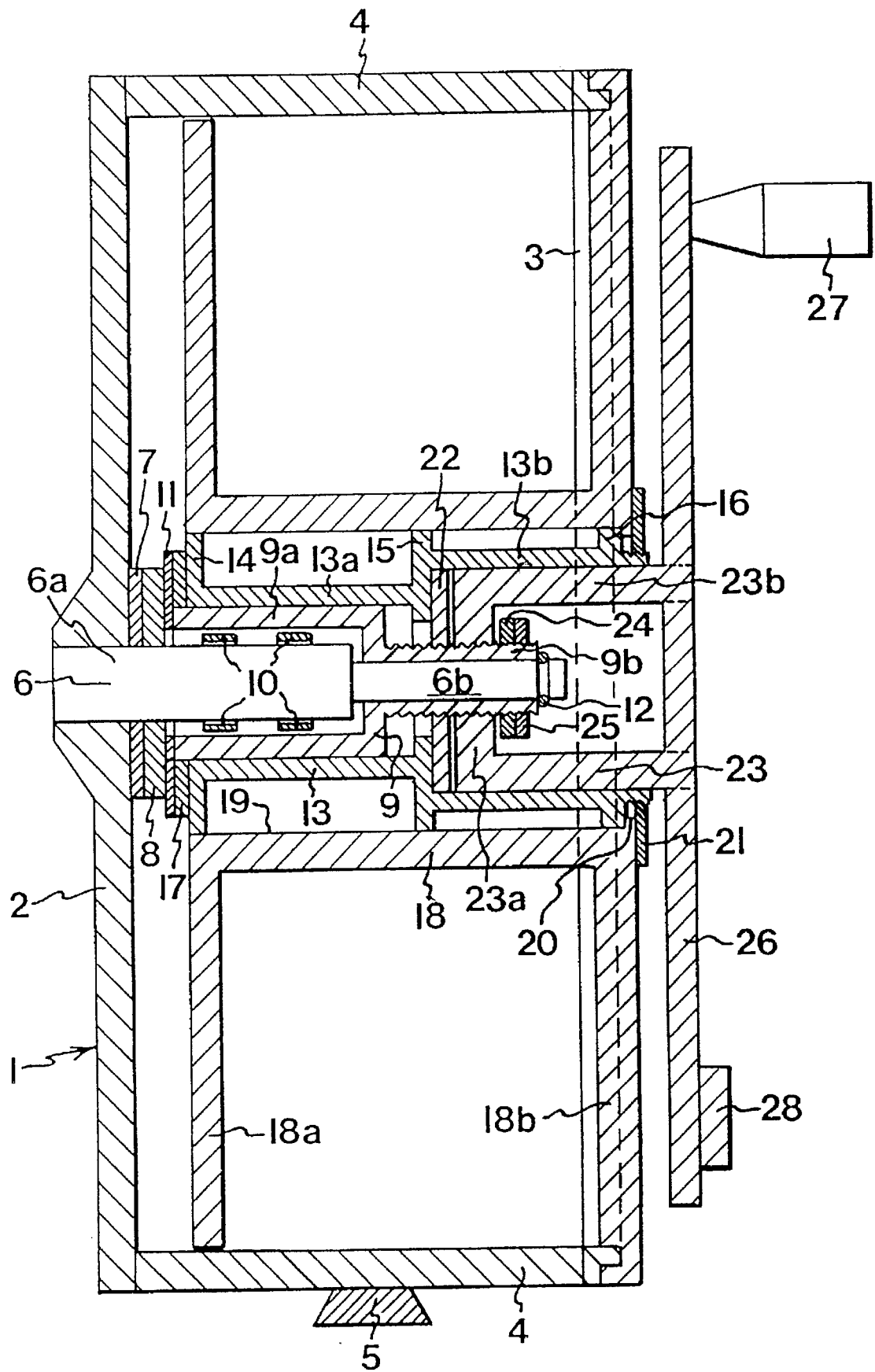

FLY-FISHING WITH VARIABLE DRAG

This invention relates to a fly-fishing reel comprising a frame, a shaft fixedly connected to the frame, a line spool rotatable about the shaft, a handle for rotating the line spool in one direction for winding a line thereon, a brake mechanism having two cooperating drag washers for braking the line spool when rotated in the other direction for unwinding the line, an inner sleeve which is rotatably mounted on the shaft and at one end of which is fixed one of the drag washers, and an outer sleeve which is rotatably mounted on the inner sleeve and constitutes a hub non-rotatably connected to the line spool.

A prior-art fly-fishing reel of this type is described in Swedish Patent Specification 8700434-7. In this known fly-fishing reel, the outer sleeve is so mounted on the inner sleeve by means of a free-wheeling bearing that it is freely rotatable, along with the line spool, about the inner sleeve in the winding direction, but is non-rotatably connected to the inner sleeve in the unwinding direction. One of the drag washers is fixed to the shaft, whereas the other drag washer is fixed to the inner sleeve. An adjusting knob is screwed on a threaded end portion of the shaft and serves to press the drag washers against one another. Since the adjusting knob and the handle are located on the same side of the fly-fishing reel, the fisherman is able to operate both the adjusting knob and the handle with one hand, and thus does not have to shift the fishing rod carrying the fly-fishing reel from one hand to the other when fishing.

However, the prior-art fly-fishing reel suffers from certain drawbacks. When the line is pulled out by a fish and is unwound from the line spool, which then rotates against a braking effect suitably varied for playing the fish, also the handle is rotated and may thus be difficult to get hold of and even give the fisherman a rap over the fingers when he is to begin winding the line. When he begins to turn the handle in order to wind the line on the spool, the pay-out of the line is abruptly ended, which may result in a line break. Another drawback is that the fisherman has to switch between operating the handle and operating the adjusting knob when playing the fish.

The object of the present invention is to provide a fly-fishing reel obviating the drawbacks mentioned above.

According to the invention, this object is achieved by a fly-fishing reel which is of the type stated by way of introduction and is characterized in that the inner sleeve is so mounted on the shaft by means of a free-wheeling bearing as to be freely rotatable about the shaft in the winding direction but non-rotatably connected to the shaft in the unwinding direction, that the inner sleeve has an externally threaded portion at its other end, that the outer sleeve is freely rotatable about the inner sleeve in both directions, that the other drag washer is fixed to the outer sleeve, and that an operating sleeve, which is non-rotatably connected to the handle, is screwed on the threaded portion of the inner sleeve in order, when the handle is rotated in the winding direction, to be further screwed on this threaded portion while being axially pressed against the outer sleeve such that the two drag washers are pressed harder against one another.

Preferably, a friction washer is provided between the two drag washers.

In a preferred embodiment, the operating sleeve is retained on the threaded portion of the inner sleeve with the aid of a locking nut means, and the handle is releasably connected to the operating sleeve.

Preferably, the inner sleeve is axially fixed to the shaft by means of a thrust bearing, which is arranged between the frame and the drag washer fixed to the inner sleeve, and a locking washer, which is arranged in a circumferential groove in the shaft and applied against the threaded end portion of the inner sleeve.

The invention will be described in more detail below with reference to the accompanying drawing, showing a longitudinal section of an embodiment of the fly-fishing reel according to the invention.

The illustrated fly-fishing reel comprises a frame 1 which is formed as an integral piece and composed of a circular side plate 2, a circular ring 3 of essentially the same diameter as the side plate 2, and four stay rods 4 extending axially between the side plate 2 and the ring 3 and being angularly spaced 90°. A foot 5 for mounting the fly-fishing reel on a fishing rod is attached to one of the stay rods 4.

A shaft 6, coinciding with the axis of the side plate 2 and the ring 3, is at one end fixedly connected to the side plate. The shaft 6 comprises a first portion 6a, which is located closest to the side plate 2, and a second portion 6b, which has a smaller diameter than the first portion 6a. A washer 7 is fixed to the shaft 6 adjacent to the side plate 2. A thrust roller bearing 8 is arranged inwardly of the washer 7.

An inner sleeve 9 is so mounted on the shaft 6 by means of a free-wheeling bearing 10 as to be freely rotatable about the shaft in one direction but non-rotatably connected to the shaft in the other direction. The free-wheeling bearing 10 may be an INA bearing of type designation HFL 0812. The inner sleeve 9 comprises a first portion 9a, which is located closest to the side plate 2, and a second portion 9b, which has a smaller outside diameter as well as a smaller inside diameter than the first portion 9a. The inside diameter of the second sleeve portion 9b equals the outside diameter of the second shaft portion 6b. The free-wheeling bearing 10 is arranged between the first portion 9a of the inner sleeve 9 and the first portion 6a of the shaft 6. At the and facing the side plate 2, the inner sleeve 9 supports a first drag washer 11, which is integrally formed with the inner sleeve and is applied against the thrust roller bearing 8. AT the end facing away from the side plate 2, the inner sleeve 9 is axially fixed by means of a locking washer 12, which is arranged in a circumferential groove in the second portion 6b of the shaft 6. The second portion 9b of the inner sleeve 9 is externally threaded.

An outer sleeve 13 is rotatably mounted on the inner sleeve 9. The outer sleeve 13 comprises a first portion 13a, which is located closest to the side plate 2, and a second portion 13b, which has a larger inside diameter than the first portion 13a, whose inside diameter equals the outside diameter of the first portion 9a of the inner sleeve 9. The first portion 13a of the outer sleeve 13 is so mounted on the first portion 9a of the inner sleeve 9 that the outer sleeve 13 is freely rotatable about the inner sleeve 9 in both directions. The outer sleeve 13 has three radially-projecting circumferential flanges 14, 15 and 16. The first flange 14 is provided at the end of the outer sleeve 13 that is closest to the side plate 2, the second flange 15 is provided at the transition between the first portion 13a and the second portion 13b, and the third flange 16 is provided a short distance from the other end of the outer sleeve 13. The three flanges 14, 15 and 16 have the same outside diameter.

A friction washer 17 made of cork is provided on the inner sleeve 9 between the first drag washer 11 connected to the inner sleeve 9 and the flange 14, the latter forming a second drag washer which is connected to the outer sleeve 13.

The outer sleeve 13 supports a line spool 18, which has two radial, circular and flanges 18a and 18b as well as an axial, through going centre hole 19 whose diameter equals the outside diameter of the flanges 14, 15 and 16. The end flange 18a closest to the side plate 2 extends almost up to the inner boundary surface of the stay rods 4, while the other end flange 18b extends up to their outer boundary surface, as illustrated in the drawing. The flanges 14, 15 and 16 of the outer sleeve 13 are inserted in the centre hole 19 of the line spool 18. The third flange 16 of the outer sleeve 13 has two diametrically opposed flat portions (not shown) inserted in a matching part of the centre hole 19 in the end flange 18b so as to produce a non-rotatable connection between the outer sleeve 13 and the line spool 18. The third flange 16 rests axially on an annular lug 20 projecting into the centre hole 19. In a portion which is located outside the third flange 16 and is externally threaded, the outer sleeve 13 projects a distance beyond the end flange 18b of the line spool 18. A nut 21 is screwed on this portion of the outer sleeve 13 so as to fix, together with the lug 20, the outer sleeve 13 and the line spool 18 axially in relation to one another.

A thrust roller bearing 22 is arranged on the second portion 9b of the inner sleeve 9 and is positioned in the second portion 13b of the outer sleeve 13 so as to be applied against the circumferential internal lug provided at the transition between the two portions 13a and 13b of the outer sleeve 13.

An operating sleeve 23 comprises a first portion 23a, which is located closest to the side plate 2, and a second portion 23b, which has the same outside diameter as the first portion 23a but a larger inside diameter. The outside diameter of the operating sleeve 23 is somewhat smaller than the inside diameter of the second portion 13b of the outer sleeve. The operating sleeve 23 is internally threaded in its first portion 23a and screwed on the externally-threaded second portion 9b of the inner sleeve 9. Two locking nuts 24 and 25 are screwed on the second portion 9b of the inner sleeve 9 in order to prevent unscrewing of the operating sleeve 23. The second portion 23b of the operating sleeve 23 projects a distance beyond the end flange 18b of the line spool 18. A handle 26 is arranged in a diametral groove (not shown) at the free end of the operating sleeve 23 and is releasably connected to the operating sleeve 23 by means of screws (not shown) or some other suitable means. The handle 26 is provided with a handle knob 27 at one end and with a counterweight 28 at the other end.

When the handle 26 is turned clockwise (as seen from the right in the drawing), the operating sleeve 23 is further screwed on the second portion 9b of the inner sleeve 9 and is axially pressed against the outer sleeve 13 via the thrust roller bearing 22, so that the drag washer 11 fixed to the inner sleeve 9 and the drag washer 14 fixed to the outer sleeve 13, via the intermediary friction washer 17, are pressed harder against one another, thereby increasing the frictional engagement between the drag washers 11 and 14. When the handle 26 is turned in the opposite direction, the frictional engagement is reduced accordingly.

When a line (not shown) wound on the line spool 18 is pulled out by a fish and unwound from the spool, the letter rotates against a braking effect set by means of the handle 26. It should be observed that tit is in the winding direction, i.e. the direction in which the handle 26, the operating sleeve 23, the inner sleeve 9, the outer sleeve 13 and, hence, the line spool 18 are rotated for winding the line on the line spool, that the inner sleeve 9 is freely rotatably about the shaft 6. The winding direction coincides with the clockwise direction, as seen from the right in the drawing. As mentioned in the foregoing, the inner sleeve 9 is non-rotatably connected to the shaft 6 in the other direction, i.e. the unwinding direction.

When playing the fish, the fisherman may thus all the time keep a hold of the handle knob 27 with one hand. When the braking effect acting on the outer sleeve 13 and, hence, on the line spool 18 is to be changed, the handle 26 is turned in one direction or the other, as described above. When the line is to be wound on the spool for retrieving the fish, the handle 26 is turned clockwise (as seen from the right in the drawing), so that the frictional engagement between the drag washers 11 and 14 is increased until it is sufficient to overcome the resistance of the fish and entrain the outer sleeve 13 in the rotation of the inner sleeve 9.

I claim:

1. A fly-fishing reel, comprising: a frame, a shaft fixedly connected to the frame, a line spool rotatable about the shaft, a handle for rotating the line spool in a winding direction for winding a line thereon, a brake mechanism having two cooperating drag washers for braking the line spool when rotated in an unwinding direction for unwinding the line, an inner sleeve rotatably mounted on the shaft, one of the drag washers being fixed at a first end of the inner sleeve, and an outer sleeve rotatably mounted on the inner sleeve forming a hub non-rotatably connected to the line spool, wherein the inner sleeve is mounted on the shaft by a free-wheeling bearing so as to be freely rotatable about the shaft in the winding direction and non-rotatable about the shaft in the unwinding direction, the inner sleeve has an externally threaded portion at a second end, the outer sleeve is freely rotatable about the inner sleeve in the winding and unwinding directions, the other drag washer is fixed to the outer sleeve, and an operating sleeve non-rotatably connected to the handle, is screwed on the threaded portion of the inner sleeve so as to be further screwed on the threaded portion when the handle is rotated in the winding direction and to axially press the operating sleeve against the outer sleeve so that the two drag washers are pressed harder against one another.

2. A fly-fishing reel as set forth in claim 1, further comprising a friction washer provided between the two drag washers.

3. A fly-fishing reel as set forth in claim 1, wherein the operating sleeve is retained on the threaded portion of the inner sleeve by a locking nut means, and the handle is releasably connected to the operating sleeve.

4. A fly-fishing reel as set forth in claim 1, wherein the inner sleeve is axially fixed to the shaft by a thrust bearing arranged between the frame and the drag washer fixed at the first end of the inner sleeve, and a locking washer arranged in a circumferential groove in the shaft and applied against the threaded end portion of the inner sleeve.

* * * * *